United States Patent
Liu et al.

(10) Patent No.: US 7,672,316 B2
(45) Date of Patent: Mar. 2, 2010

(54) METHOD FOR PROCESSING OVERHEAD OF OPTICAL NETWORK AND DEVICE THEREOF

(75) Inventors: Haibo Liu, Shenzhen (CN); Fengguo Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 235 days.

(21) Appl. No.: 11/865,151

(22) Filed: Oct. 1, 2007

(65) Prior Publication Data

US 2008/0170865 A1 Jul. 17, 2008

Related U.S. Application Data

(63) Continuation of application No. PCT/CN2006/000427, filed on Mar. 20, 2006.

(30) Foreign Application Priority Data

Apr. 1, 2005 (CN) .................. 2005 1 0033832

(51) Int. Cl.
*H04L 12/56* (2006.01)
(52) U.S. Cl. ................ 370/395.7; 370/409; 370/412
(58) Field of Classification Search .................. None
See application file for complete search history.

(56) References Cited

U.S. PATENT DOCUMENTS

| | | | | |
|---|---|---|---|---|
| 5,600,648 A | * | 2/1997 | Furuta et al. ................ | 370/248 |
| 6,157,658 A | * | 12/2000 | Toyoyama et al. .......... | 370/505 |
| 6,580,731 B1 | * | 6/2003 | Denton ....................... | 370/539 |
| 7,424,036 B1 | * | 9/2008 | Alexander et al. .......... | 370/474 |
| 2002/0141455 A1 | * | 10/2002 | Akaike et al. ............... | 370/535 |
| 2002/0141456 A1 | | 10/2002 | Wang et al. | |

FOREIGN PATENT DOCUMENTS

| | | |
|---|---|---|
| CN | 1428961 | 7/2003 |
| CN | 1492631 | 4/2004 |
| GB | 2 287 608 | 9/1995 |
| JP | 2001144714 | 5/2001 |
| WO | WO03/003629 | 1/2003 |

OTHER PUBLICATIONS

European Search Report, dated Jun. 19, 2008; Application No./Patent No. 06722079.8-2415 PCT/CN2006000427.

* cited by examiner

*Primary Examiner*—Daniel J Ryman
*Assistant Examiner*—Brian Roberts
(74) *Attorney, Agent, or Firm*—Ladas & Parry LLP

(57) ABSTRACT

A method for overhead processing of optical network and device thereof are disclosed, the device includes: an overhead memory, an overhead processor, and an overhead processor control module. The overhead processor control module is used for controlling the operation of the overhead memory and the overhead processor. The method includes: a system chip inputs the time slots of all overhead bytes that will be processed and descrambled data, and corresponding virtual container numbers, the overhead processor encodes the byte and stores all overhead byte of the same channel in the address of the same overhead memory; at the same time it stores in turn the overhead byte of different channels in different address spaces based on the virtual container numbers, so that an overhead processing logic performs a polling process. The method and device only use a set of overhead processing logic for the overhead of large capacity chips, and save the area and power consumption greatly, thereby reduce the production cost.

10 Claims, 6 Drawing Sheets

| HPOH[7:0] | CODE[2:0] |
|---|---|
| Storage overhead bytes J1/B3/C2/G1/H4/K3 | Overhead byte sequence code |

Fig. 4

| CODE[2:0] | 001 | 010 | 011 | 100 | 101 | 110 | 000    111 |
|---|---|---|---|---|---|---|---|
| Respective overhead byte | J1 | B3 | C2 | G1 | H4 | K3 | Null |

Fig. 5

US 7,672,316 B2

METHOD FOR PROCESSING OVERHEAD OF OPTICAL NETWORK AND DEVICE THEREOF

CROSS-REFERENCE TO RELATED APPLICATION

This application is a CA of International Application No. PCT/CN2006/000427 filed Mar. 20, 2006, designating the United States and claiming priority from Chinese Patent Application No. 200510033832.4 filed on Apr. 1, 2005. The subject matter of both foregoing applications is incorporated herein by reference.

FIELD OF THE INVENTION

The present invention relates to optical communication network technologies, particularly to a method and apparatus of overhead processing in optical networks.

BACKGROUND OF THE INVENTION

In the prior art, overhead bytes, such as J1/B3/C2/G1/H4/K3, which are used to ensure normal transmission of high-order path VC-4/STS-1 SPE, will be processed in mapping chip and low-order cross chip in a Synchronous Digital Hierarchy (SDH)/Synchronous Optical Network (SONET) overhead processing equipment. J1 byte is used to ensure path continuous transmission, B3 byte is used to check if there is an error bit in a path, C2 byte is used to ensure that a signal type is right, G1 is used to acknowledge receipt of a remote error bit alarm, H4 is used for indication of low-order path multi-frames, and K3 is used for APS protection shift among VC-4 high-order paths.

A conventional implementing method is to process an overhead byte when a corresponding time slot arrives, then generate a corresponding alarm and report to a micro-processor. Generally speaking, overhead byte processing and arrival of overhead time slot are closely interrelated, and an overhead byte is processed immediately when an overhead time slot arrives.

One processing manner of prior art is that the number of overhead processing logics should be equal to the number of overheads such as High-order path Overhead (HPOH). So for an instance application of 4×622M, 16 overhead processing logics are required to be instantiated, as shown in FIG. 1. The overhead processing logics are provided correspondingly without multiplexing, which results in increased area of chips and higher power consumption. Accordingly, the manufacturing cost of chips rises sharply, and overhead processing of large scale chips, such as 10 G, 40 G chips, can not be achieved.

Another processing method of prior art is to achieve certain degree of multiplexing, as shown in FIG. 2. Still take an application of 4×622M as an example, if the work clock of the chip is 77.76 MHz, the chip will multiplex the overhead processing logics in unit of 622M, or 8×77.76 MHz parallel data, i.e., four VC-4s use a set of overhead processing logic in common. A memory is used to store middle results, and the integration of the entire logics and the memory will be instantiated four times, thus accomplishing overhead processing logics with a capacity of 2.5 G. Although certain degree of overhead processing logic multiplexing is adopted in the implementing method, the restriction to the system clock frequency still can not be overcome. For the 8×77.76 MHz parallel data, only four VC-4s can be multiplexed, and for the 8×77.76 MHz parallel data, only eight VC-4s high-order overhead processing can be multiplexed. Since the work clock of the chip can not be increased unlimitedly, the overhead processing of large capacity chips such as 20 G(128 VC-4), 40 G(256 VC-4) chips, will also result in increased area of chips, increased power consumption, and accordingly the manufacturing cost of the chip will be increased.

Therefore, there exists some defects in the prior art, and improvements and developments are required.

SUMMARY OF THE INVENTION

According to an embodiment of the present invention, a method and device of overhead processing of optical network is provided to process overheads of large scale chips in optical transmission, so that the chip area is decreased, the chip power consumption is reduced, and the manufacturing cost of the chip is reduced.

According to an embodiment of the present invention, a method for overhead processing of optical network is provided. The method includes:

receiving overhead bytes and virtual container numbers corresponding to the overhead bytes;

storing the overhead bytes of different paths in different address spaces of an overhead memory according to the virtual container numbers;

determining a corresponding overhead processing unit for a overhead byte of the stored overhead bytes according to type of the overhead byte;

processing the overhead byte by the corresponding overhead processing unit;

the number of the overhead processing unit corresponding to a same one type of the overhead bytes is less than that of the path.

According to an embodiment of the present invention, a device for overhead processing of optical network is provided, the device comprising;

a receiving unit, configured to receive overhead bytes and virtual container numbers corresponding to the overhead bytes;

an overhead memory, configured to store overhead bytes of different paths in different address spaces of the overhead memory according to the virtual container numbers;

an overhead processor comprising a plurality of overhead processing units, wherein, each of the overhead processing units is configured to process a overhead byte of corresponding type stored in the overhead memory;

the number of the overhead processing units corresponding to overhead types of a same one type is less than that of the paths.

In the method and device of overhead processing of optical network provided by the present invention, because overhead storage and polling process are employed, only one set of overhead processing logic is used for overhead of large capacity chips, and therefore chip area and power consumption are greatly reduced, resulting in lower manufacturing cost.

BRIEF DESCRIPTION OF THE DRAWINGS

FIG. 4 is a specific structural diagram illustrating a path overhead memory HPOH-MEM according to an embodiment of the present invention;

FIG. 5 is a diagram illustrating structure of an overhead byte sequence code according to an embodiment of the present invention;

DETAILED DESCRIPTION OF THE EMBODIMENTS

Specific implementations of the present invention will be described in detail below with reference to the accompanying drawings.

According to an embodiment, a multiplexing process architecture is employed in the optical network overhead processing. The entire overhead processing device includes the following four parts: an overhead memory, an overhead processor, a middle status/process result memory, and an overhead processor control module.

Figure 1:
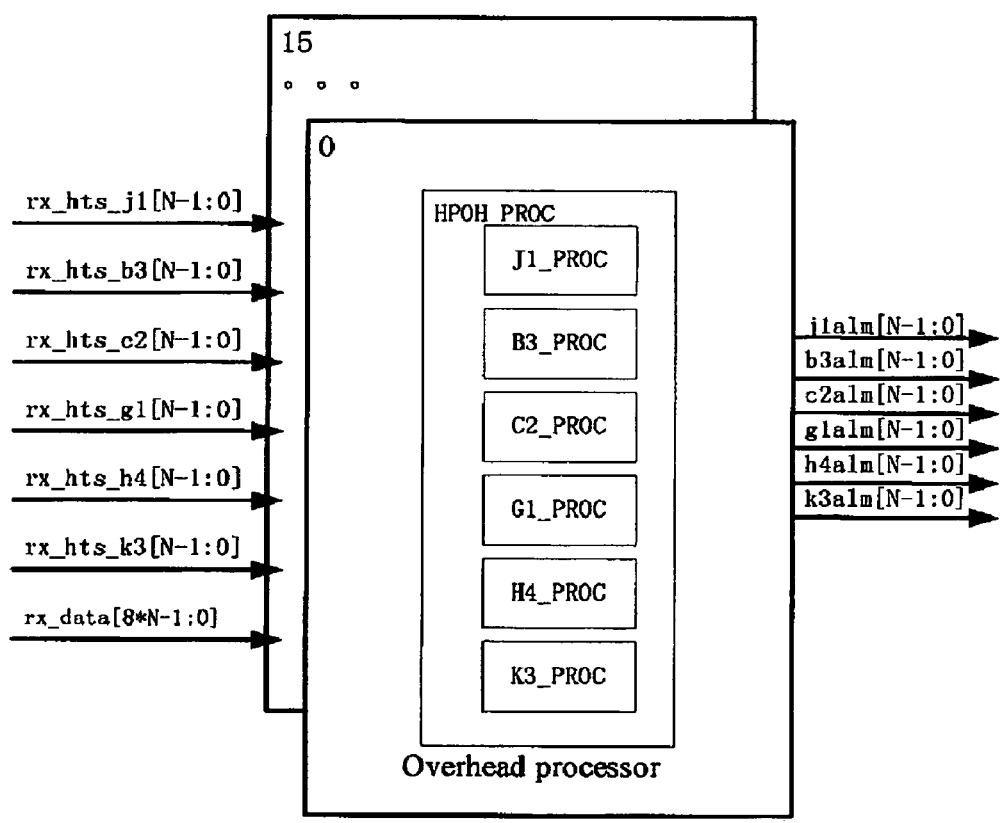
FIG. 1 is functional block diagram illustrating a prior art VC-4/STS-1 overhead processing manner without multiplexing.
Figure 2:
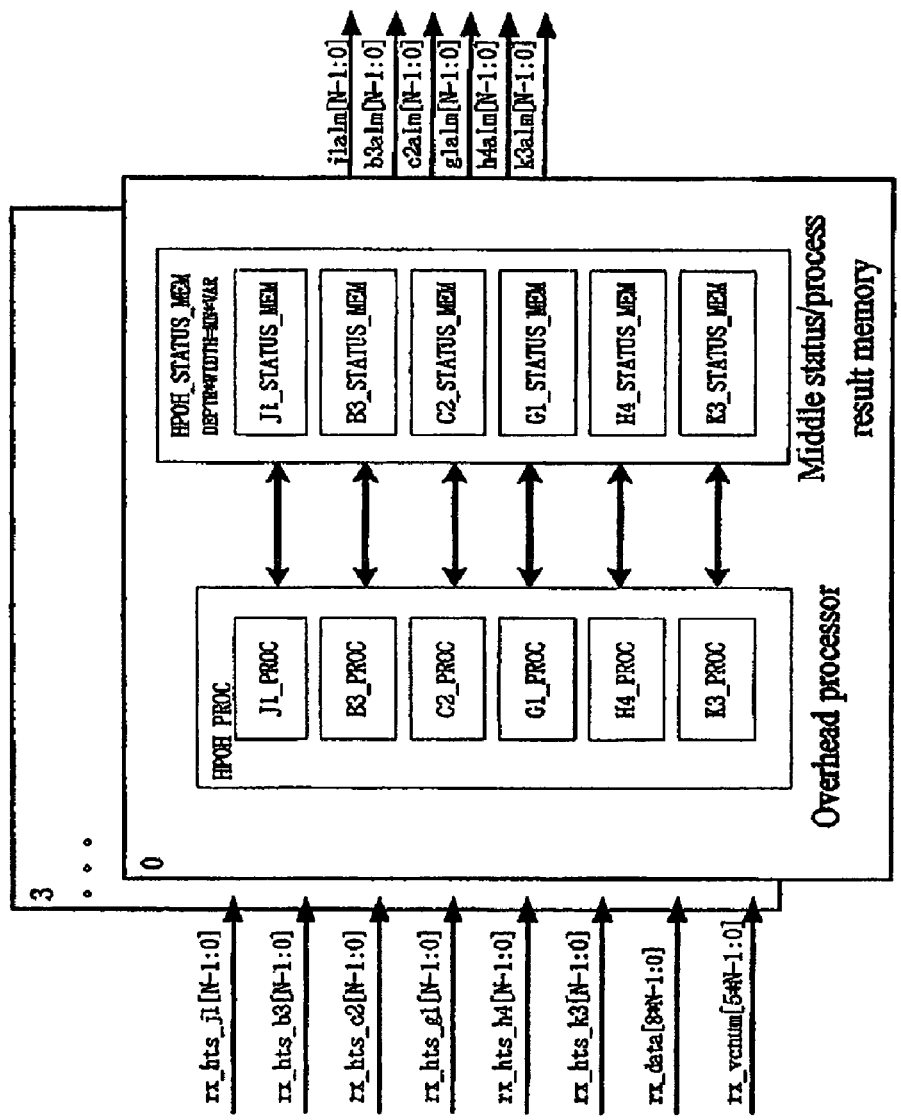
FIG. 2 is functional block diagram illustrating a second VC-4/STS-1 overhead processing manner in prior art.
Figure 3:
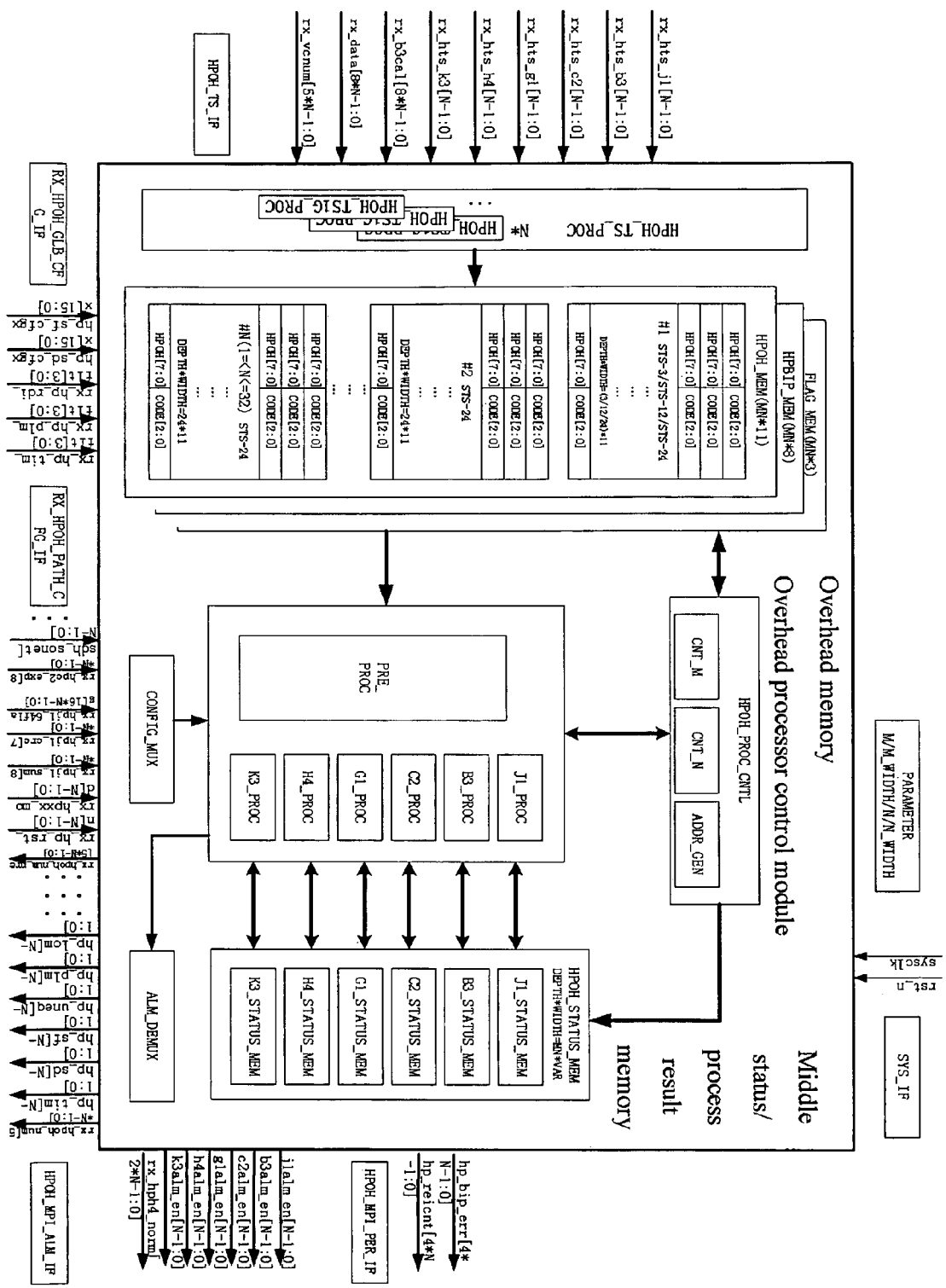
FIG. 3 is functional diagram illustrating VC-4/STS-1 overhead and poll processing according to an embodiment of the present invention.
Figure 7:
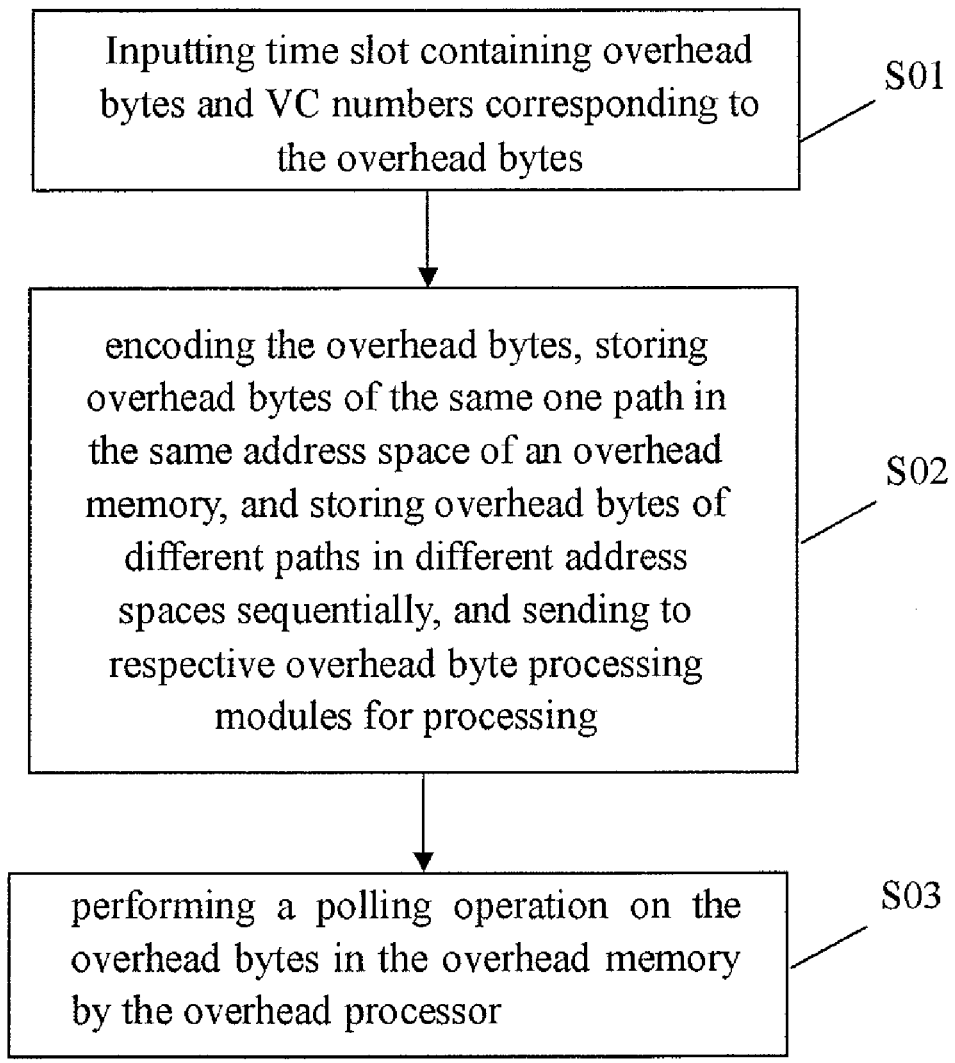
FIG. 7 is a schematic diagram illustrating an overhead processing method according to the present invention.

With reference to FIG. 3, a system chip, under control of the overhead processor control module HPOH_PROC_CNTL, inputs time slots containing overhead bytes J1, B3, C2, G1, H4 and K3 that are to be processed, de-scrambled data and numbers of virtual containers VC-NUM which correspond to the overhead bytes;

The overhead processor HPOH_PROC encodes the overhead bytes, stores all overhead bytes of a same path in a same address of the memory HPOP_MEM, so as to save the memory space; stores the overhead bytes in different paths in different address spaces according to the VC-NUM, and based on byte codes, sends the overhead bytes J1, B3, C2, G1, H4 and K3 that are read from the overhead memory HPOP_MEM to the corresponding overhead byte process modules J1_PROC, B3_PROC, C2_PROC, GL_PROC, H4_PROC, K3_PROC for processing;

The overhead processor (HPOH_PROC) performs a polling operation on the overhead bytes in the overhead memory ((HPOP_MEM). In the polling operation, the overhead processor reads the memory sequentially and repeatedly according to the cyclically varied addresses generated by the overhead processor control module. FIG. 7 shows a flow chart of the overhead processing method according to an embodiment. Wherein, S01: inputting a time slots containing overhead bytes and VC numbers corresponding to the overhead bytes; S02: encoding the overhead bytes, storing overhead bytes of the same one path in the same address space of an overhead memory, and storing overhead bytes of different paths in different address spaces sequentially, and sending to respective overhead byte processing modules for processing; S03: performing a polling operation on the overhead bytes in the overhead memory by the overhead processor.

The specific structure of the overhead memory (HPOP_MEM) for a path is shown in FIG. 4, in which the overhead bytes J1/B3/C2/G1/H4/K3 and the sequence codes of the overhead bytes are stored in turn. The width of the HPOH_MEM is fixed as 8+3=11 bits, and the depth will be increased with the increase of the processing capacity of the system chip IP CORE. In an embodiment, each VC-4/STS-1 SPE is allocated with three store spaces, each of which is 11 bits in width. When a mapping structure is STS-1, all the three address spaces are used up, and each address space, according to byte sequence code (CODE[2:0]), simultaneously stores six bytes to be processed: J1/B3/C2/G1/H4/K3. When a mapping structure is VC-4, only a previous address space is used, and each address space, according to sequence code (CODE [2:0]), stores six bytes to be processed: J1/B3/C2/G1/H4/K3.

At the same time, the overhead processor control module HPOH_PROC_CNTL generates corresponding cyclically varied addresses to read the high-order path overhead memory (HPOP_MEM) sequentially and repeatedly, from the overhead bytes of the first VC-4/STS-1 to the overhead bytes of the M×N (M=3/12/24, N=0/1/2 . . . 30/31) VC-4/STS-1, then back to the overhead bytes of the first VC-4/STS-1, starting a new circulation. In the polling operation, eight bits of the overhead byte HPOH[7:0] and the byte code CODE [2:0] bit are read out simultaneously, and sent to the overhead processor HPOH_PROC. If the CODE [2:0] bit is not the same with a former one, it is indicated that this overhead has not been processed and is to be processed in this polling operation. The byte code CODE [2:0] is then decoded, and the specific byte HPOH[7:0] that corresponds to the byte code is determined and sent to the corresponding overhead byte process module for further processing. If the CODE [2:0] bit is the same with the former one, it is indicated that this overhead has been processed and is not to be processed in this polling operation. After the eight bits of the overhead byte and byte code CODE [2:0] bit are read out, the CODE [2:0] bit in this polling should be saved and is used for comparing with the next CODE [2:0] bit and determining whether the polled overhead byte has already been processed.

The overhead processor is divided into six independent and parallel modules: J1_PROC, B3_PROC, C2_PROC, G1_PROC, H4_PROC, K3_PROC, which process J1, B3, C2, G1, H4 and K3 respectively. The eight-bit byte information sent from the high-order path overhead memory HPOH_MEM module will pass through a 1-6 de-multiplexer and be de-multiplexed into six paths, each path having eight bits, which are sent to six corresponding overhead byte process modules respectively. The selection signal of the de-multiplexer is the byte code CODE[2:0]. The structure of the byte code CODE[2:0] is defined in FIG. 5.

Each overhead processing module performs operations on the received overhead byte and the middle status that is read out from the middle status/process result memory STATUS_MEM, and then writes the process result such as error bit alarm count into the middle status/process result memory STATUS_MEM, and stores the middle status value in the STATUS_MEM, so that the overhead processor can be used for processing the same bytes in other paths. For a next same overhead processing in the current path, the middle status value is read out, so that the integrity of the overhead processing information is obtained, thereby achieving multiplexing of the overhead processing logics.

The processing of B3 is different from that of the other five overhead bytes. The processing of the other five overhead bytes only relates to the eight bits of the respective overheads, but the processing of B3 not only relates to the eight bits of the overhead, but also relates to the payload SPE of each frame. So a bit interleaved parity BIP-8 of the payload SPE is pre-computed by the system chip, and then stored by the IP CORE in the BIP memory at J1 time slot. The polling circuit then generates a read address which is the same with that of the HPOH_MEM, reads out the BIP-8 data at an appropriate time and outputs the same to B3 overhead processing module, and compare the same with B3 overhead bits to obtain bits errors.

The overhead processor outputs the middle status/process result value of an overhead bit so that the result value is directly stored at a storage space in the STATUS_MEM corresponding to the overhead bit.

The overhead processor control module generates corresponding cyclically varied addresses to repeatedly write in or read out from the middle status/process result memory STATUS_MEM. Due to large differences in processing of different overhead bytes, the width of the stored bits is very large. Thus respective overhead bytes are separately stored in the middle status/process result memory, which is divided into the following six memory spaces: J1_STATUS_MEM, B3_STATUS_MEM, C2_STATUS_MEM, G1_STATUS_MEM, H4_STATUS_MEM, K3_STATUS_MEM. The memory spaces use the same write/read addresses, i.e., the polling addresses of all the six overhead byte memories are the same, from the first byte of J1/B3/C2/G1/H4/K3 in the first VC-4/STS-1 to the last byte of J1/B3/C2/G1/H4/K3 in the M×N (M=3/12/24, N=0/1/2/...30/31) VC-4/STS-1, then back to the first byte of J1/B3/C2/G1/H4/K3 in the first VC-4/STS-1, starting a new circulation. Each time only one overhead byte is read out or written in, and the specific overhead byte memory to be read or written is selected by means of a read-enable signal and write-enable signal generated after the overhead byte code CODE[2:0] is decoded. In the polling operation, the alarm performance and the middle status generated by respective overhead processing modules are read from or written in the STATUS_MEM. It should be noted that the allocating and polling speed of the STATUS_MEM addresses is different in timing from that of the HPOH_MEM addresses.

The process result or the middle status of each overhead byte in each path is accessed in the STATUS_MEME according to the pre-allocated RAM space. The VC-NUM and the byte sequence code of each overhead byte have a one-to-one correspondence with the allocated address. For example, TIM alarm result, CRC value and the middle status value are accessed in a storage space in the STATUS_MEME corresponding to J1 byte; the number of B3 error bits is accessed in a storage space in the STATUS_MEME corresponding to B3 byte, and the accessing is in need of an additional BIP-8 computing module; UNEQ, VCAIS and PLM alarm results are accessed in a storage space in the STATUS_MEME corresponding to C2 byte; the number of REI error bits and RDI/E-RDI alarm result are accessed in a storage space in the STATUS_MEME corresponding to G1 byte; the lower 2 bits in H4, LOM alarm result and the middle status value of the lower 2 bits in H4 bytes of the two consecutive frames before the current frame are accessed in a storage space in the STATUS_MEME corresponding to H4 byte; APS and NAPS alarm results are accessed in a storage space in the STATUS_MEME corresponding to K3 byte.

Figure 6:
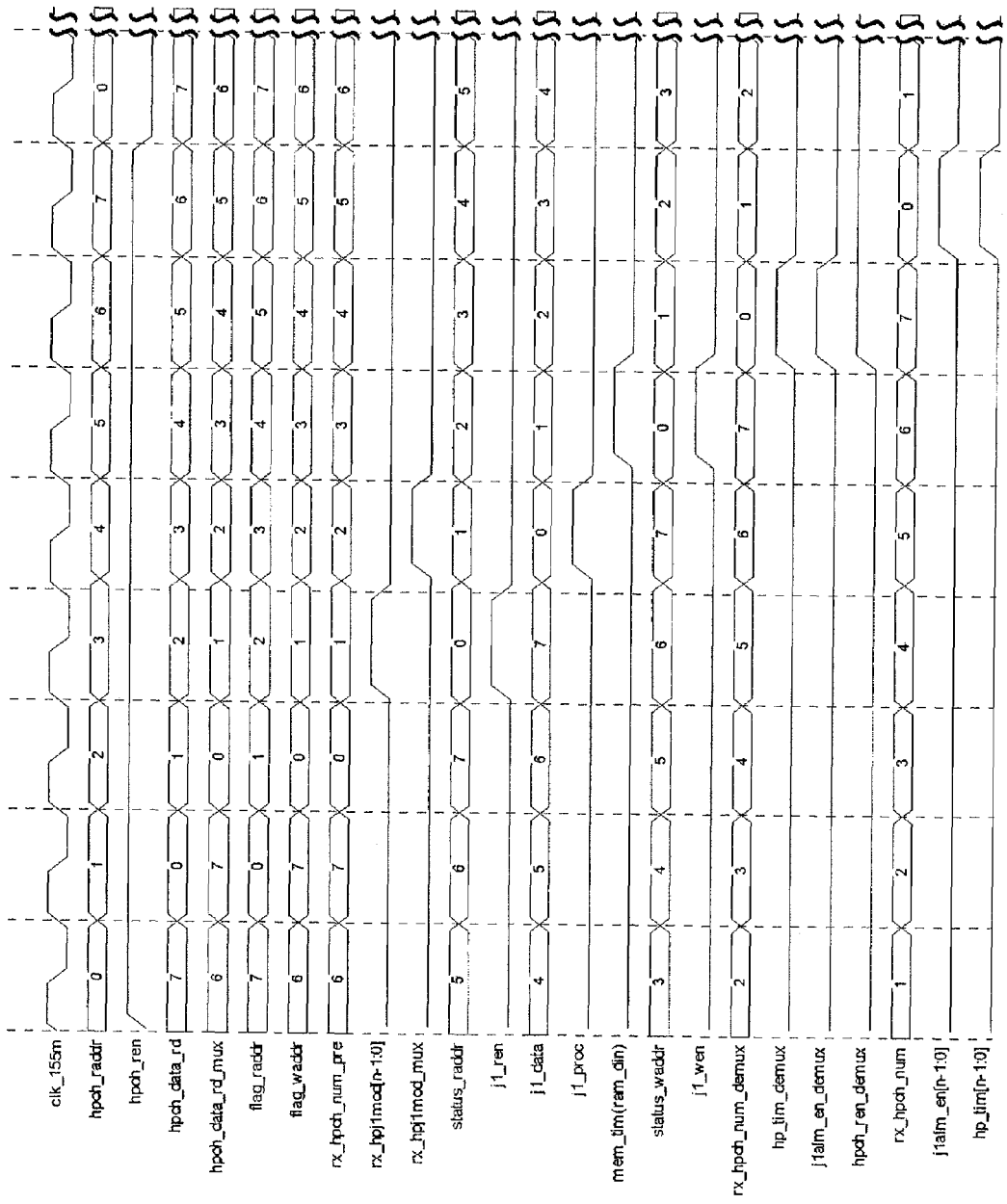
FIG. 6 is a diagram illustrating timing relationship of poll processing on overheads according to an embodiment of the present invention.

Interface circuits refer to interface integrated circuits used for communication and control between devices. The method and device for high-order overhead processing in optical networks of the present invention utilize global configuration interface circuits to receive global configuration information sent to the chip by the user, the global configuration information mainly includes reset signal, clock signal, SDH/SONET module selection signal and capacity selection signal. The path global configuration interface circuit is mainly used for configuring the specific number of filtered frames for alarm detecting and the time window of SD/SF and threshold value. The single path configuration interface circuit is mainly used for selecting the byte process modes, and J1 and C2 configuration byte. The path global configuration interface circuit and the single path configuration interface circuit both belong to path configuration interface circuits. The path configuration interface circuit mainly reports each real time alarm and performance statistics information, and the specific timing diagram of the path configuration interface circuit is shown in FIG. 6, in which SDH mode J1 byte processing with a capacity of 2.5 G is taken as an example. The timing diagram of other byte processing is the same with that of J1 byte processing, and is omitted.

The present invention only uses one set of overhead logic, and can achieve common storage of all processing results and status of the same one overhead byte, so for a larger scale overhead processing, the present invention can use RAM more conveniently, and thus the chip area can be decreased greatly.

In the following, take applications of 4×622 M capacity as an example. In the example, the area saving effects brought by processing high order overhead in a polling manner can be obviously seen. The software tool is SYNPLIFY PRO 7.3.4, the device is XINLINX VIRTEX 2:XC2V500:FG256:-5, the clock constraint is 100 MHz.

The comparative results between the present invention and prior art are shown in the following table:

| One data format with a capacity of 622M: 8 × 77M | FRQ: 105.5 MHz<br>LUT: 1496 (24%)<br>REG: 958 (15%) |
|---|---|
| Four data format with a capacity of 622M: 32 × 77M<br>Conventional manner: Directly instantiated four times | FRQ: 105.5 MHz<br>LUT: 5984 (96%)<br>REG: 3832 (60%) |
| Four data format with a capacity of 622M: 32 × 77M<br>Polling manner: instantiated one time | FRQ: 101.4 MHz<br>LUT: 2331 (37%)<br>REG: 1924 (31%) |

It can be seen that, for high-order overhead processing with a capacity of 2.5 G, if a polling process method is adopted, the lookup table is saved about ⅔ times in size, and the register is saved about ½ times in size. For high-order overhead processing with a higher capacity of 10 G, 40 G, the chip area is saved ⅞ or $^{31}/_{32}$ times in size by the use of he polling process, thus the cost of the chip can be reduced largely. In the method of the present invention, overhead processing logics are highly multiplexed and the chip area is greatly saved.

It should be explained that, in the above embodiments of the present invention, RAM memory is used in the overhead byte processing, and then a polling process is performed, or the overheads may also be stored in a FIFO manner, then is read out sequentially and processed, so as to achieve the multiplexing of overhead processing logics.

In addition, similar manners as above can be used for low order overheads, in which the overhead storage and polling process are the same with those of high order overheads, except that the low order path has a different overhead byte definition.

The above specific embodiments of the present invention are only illustrative and used for explaining the principle of the present invention, but should not be construed to limit the scope of the present invention. The scope of the present invention should be defined by the appending claims.

The invention claimed is:

1. A method for overhead processing in an optical network, comprising:
    receiving overhead bytes and virtual container numbers corresponding to the overhead bytes;
    storing overhead bytes of different paths in different address spaces of an overhead memory according to the virtual container numbers;
    obtaining an overhead byte to be processed by polling the different address Spaces of the overhead memory;

determining a corresponding overhead processing unit for the overhead byte of the stored overhead bytes according to a type of the overhead byte;

processing the overhead byte by the corresponding overhead processing unit;

wherein the number of the overhead processing units corresponding to a type of the overhead bytes is less than the number of the paths; and the obtaining the overhead byte to be processed by polling the different address spaces of the overhead memory comprises:

determining whether a byte code of the overhead byte is different from a byte code of a former polled overhead byte, wherein an address space of the former polled overhead byte is the same with that of the overhead byte, wherein the byte code is used for indicating a type of a corresponding overhead byte; and processing the overhead byte if it is determined that the byte code of the overhead byte is different from the byte code of the former polled overhead byte.

2. The method for overhead processing in an optical network according to claim 1, wherein the storing the overhead bytes of different paths in different address spaces of an overhead memory according to the virtual container numbers comprises:

storing the overhead bytes of a same one path in a same one address space of the overhead memory; and storing the overhead bytes of different paths in different address spaces of the overhead memory.

3. The method for overhead processing in an optical network according to claim 1, wherein the processing the overhead byte by the corresponding overhead processing unit comprises:

obtaining a middle status value corresponding to the overhead byte;

processing the overhead byte according to the middle status value;

writing a processing result in a middle status/process result storage unit as a middle status value.

4. The method for overhead processing in an optical network according to claim 1, wherein, the overhead bytes and corresponding byte codes thereof are sequentially stored in the overhead memory, wherein a byte code is used for indicating a type of a corresponding overhead byte.

5. The method for overhead processing in an optical network according to claim 1, wherein the overhead byte comprises one of J1, B3, C2, G1, H4 and K3.

6. A device for overhead processing in an optical network, the device comprising:

a receiving unit, configured to receive overhead bytes and virtual container numbers corresponding to the overhead bytes;

an overhead memory, configured to store overhead bytes of different paths in different address spaces of the overhead memory according to the virtual container numbers;

an overhead processor comprising a plurality of overhead processing units, wherein, each of the overhead processing units is configured to process a overhead byte of corresponding type stored in the overhead memory;

wherein the number of the overhead processing units corresponding to type of the overhead bytes is less than the number of the paths;

the device further comprises an overhead processing control unit, configured to control the overhead processor to poll the different address spaces in the overhead memory for an overhead byte to be processed; and the overhead processing unit is adapted to process an overhead byte if it is determined that a byte code of the overhead byte is different from a byte code of a former polled overhead byte, wherein an address space of the former polled overhead byte is the same with that of the overhead byte, wherein the byte code is used for indicating of a corresponding overhead byte.

7. The device for overhead processing in an optical network according to claim 6, wherein the overhead bytes are stored in the overhead memory in such a manner that the overhead bytes of a same one path are stored in a same address space of the overhead memory.

8. The device for overhead processing of optical network according to claim 6, the device further comprising a middle status and process result memory, configured to store middle status values and processing results of the overhead processing units;

wherein, each of the overhead processor units comprises:

an obtaining unit, configured to obtain the middle status and processing result;

a processing unit, configured to process a corresponding overhead byte according to the middle status and processing result;

an output unit, configured to output the processing result of the processing unit to the middle status and process result memory.

9. The device for overhead processing of optical network according to claim 6, wherein, the overhead processing control unit comprises:

an address generating unit, configured to generate cyclically varied access addresses of the overhead memory; and the overhead processor further comprises:

a polling unit, configured to obtain an overhead byte to be processed by a corresponding processing unit by accessing the overhead memory according to the cyclically varied access addresses.

10. The device for overhead processing of optical network according to claim 6, wherein, the overhead processor further comprises: a de-multiplexer, configured to send an overhead byte obtained by a polling unit to the corresponding overhead byte processing unit according to a type of the overhead byte obtained by the polling unit.

* * * * *